(12) United States Patent
Kolhe et al.

(10) Patent No.: US 11,556,766 B2
(45) Date of Patent: Jan. 17, 2023

(54) LOADING OF NEURAL NETWORKS ONTO PHYSICAL RESOURCES

(71) Applicant: HEWLETT PACKARD ENTERPRISE DEVELOPMENT LP, Houston, TX (US)

(72) Inventors: Jitendra Onkar Kolhe, Karnataka (IN); Gustavo Knuppe, Rio Grande do Sul (BR); Shyam Sankar Gopalakrishnan, Karnataka (IN); Vaithyalingam Nagendran, Karnataka (IN); Shounak Bandopadhyay, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 368 days.

(21) Appl. No.: 16/826,552

(22) Filed: Mar. 23, 2020

(65) Prior Publication Data
US 2021/0295139 A1    Sep. 23, 2021

(51) Int. Cl.
*G06F 9/50* (2006.01)
*G06N 3/063* (2006.01)
*G06N 3/04* (2006.01)

(52) U.S. Cl.
CPC ........... *G06N 3/063* (2013.01); *G06F 9/5027* (2013.01); *G06F 9/5083* (2013.01); *G06N 3/0454* (2013.01)

(58) Field of Classification Search
CPC ........ G06N 3/063; G06N 3/0454; G06N 3/10; G06F 9/5027; G06F 9/5083; G06F 9/5038; G06F 9/5077
See application file for complete search history.

(56) References Cited

U.S. PATENT DOCUMENTS

| 2017/0178725 | A1 | 6/2017 | Yang et al. | |
| 2019/0095796 | A1* | 3/2019 | Chen | G06N 3/0454 |
| 2019/0114548 | A1 | 4/2019 | Wu et al. | |
| 2019/0286972 | A1 | 9/2019 | El et al. | |
| 2019/0340499 | A1 | 11/2019 | Burger et al. | |
| 2020/0201679 | A1* | 6/2020 | Wentz | G06F 9/468 |
| 2020/0202215 | A1* | 6/2020 | Sadowski | G06F 9/5077 |
| 2021/0049231 | A1* | 2/2021 | Majnemer | G06F 17/16 |

OTHER PUBLICATIONS

Ankit et al., PUMA: A Programmable Ultra-efficient Memristor-based Accelerator for Machine Learning Inference, ASPLOS, Apr. 2019 (17 pages).
Eri Ogawa et al., "A Compiler for Deep Neural Network Accelerators to Generate Optimized Code for a Wide Range of Data Parameters from a Hand-crafted Computation Kernel," Abstract only, Apr. 2019, pp. 1-2, IEEE.

(Continued)

*Primary Examiner* — Sisley N Kim
(74) *Attorney, Agent, or Firm* — Trop, Pruner & Hu, P.C.

(57) ABSTRACT

In some examples, a system generates a neural network comprising logical identifiers of compute resources. For executing the neural network, the system maps the logical identifiers to physical addresses of physical resources, and loads instructions of the neural network onto the physical resources, wherein the loading comprises converting the logical identifiers in the neural network to the physical addresses.

19 Claims, 6 Drawing Sheets

(56) References Cited

OTHER PUBLICATIONS

Eri Ogawa et al., A Compiler for Deep Neural Network Accelerators to Generate Optimized Code for a Wide Range of Data Parameters from a Hand-crafted Computation Kernel, Apr. 2019 (14 pages).
Hemsoth, Nicole, Thenextplatform, HPE Developing its own low power "Neural Network" Chips, Nov. 9, 2017 (13 pages).
Hopkins et al., HP Labs, The Dot Product Engine downloaded Feb. 11, 2020 (12 pages).
Pedro Bruel et al., "Generalize or Die: Operating Systems Support for Memristor-based Accelerators," Sep. 6, 2017, pp. 1-8.
Wikipedia, Domain-specific language last edited on Feb. 11, 2020 (13 pages).
Wikipedia, Neural network last edited Jan. 20, 2020 (10 pages).

* cited by examiner

LOADING OF NEURAL NETWORKS ONTO PHYSICAL RESOURCES

BACKGROUND

A neural network can include a network of artificial neurons or nodes that are linked together to perform artificial intelligence (AI) tasks. Neural networks can include deep neural networks, which are made up of multiple layers. For example, a deep neural network can include an input layer, an output layer, and hidden layer(s) between the input layer and the output layer. Each layer of the deep neural network can perform specific operations, such as sorting, matrix multiplications, and so forth.

BRIEF DESCRIPTION OF THE DRAWINGS

Some implementations of the present disclosure are described with respect to the following figures.

Figure 1:
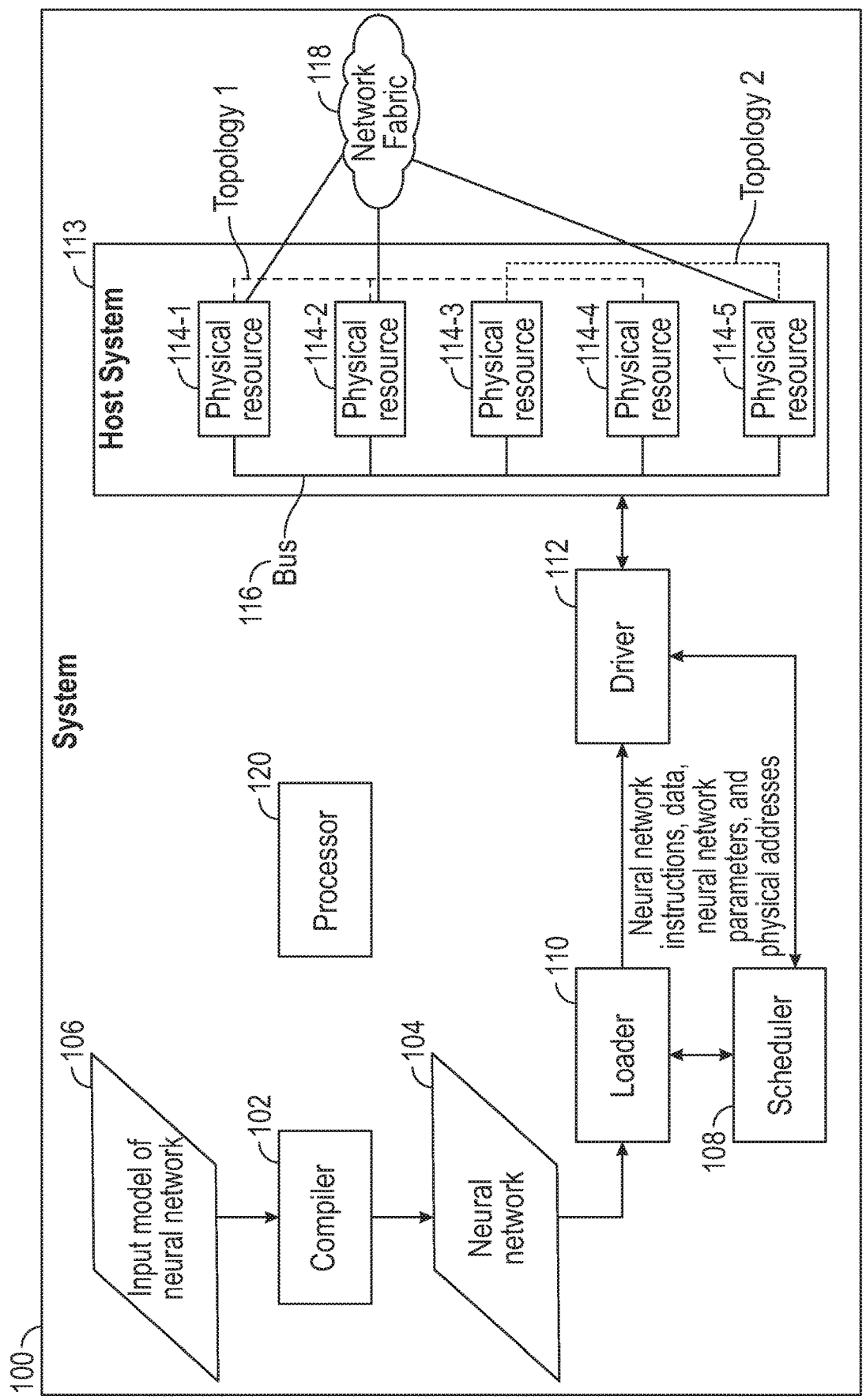
FIG. 1 is a block diagram of an example system that includes physical resources that can be used to deploy neural networks based on mappings of logical identifiers to physical addresses by a scheduler, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Neural networks such as deep neural networks can be complex and large. The complexity and size of deep neural networks are increasing in terms of the number of hidden layers, and the number of neurons included in each layer. Also, the number of parameters that each layer operates on can be relatively large.

In some cases, a neural network can be implemented on an accelerator device, which is a hardware processing device that is designated to execute instructions of the neural network. For example, the accelerator device can include a dot product engine that includes circuits for performing vector-matrix or dot product computations. In specific examples, the dot product engine can include a memristive crossbar array including memristors at junctions or crosspoints of the array.

In other examples, accelerator devices can be implemented using other types of hardware processing devices, including programmable integrated circuit devices, a programmable gate array, a digital signal processor, and so forth.

It can be challenging to implement a neural network on a single accelerator device, due to computational and/or bandwidth limitations of a single accelerator device. To achieve scalability of a neural network, developers may attempt to deploy the neural network across multiple accelerator devices. To improve utilization of the accelerator devices when executing the neural network, a compiler that generated the neural network may have to be configured with information of the physical resources (included in the accelerator devices) for deploying the neural network.

A "physical resource" can refer to a resource used to execute a part of a neural network. A physical resource can refer to an entirety of the accelerator device, or to a portion of the accelerator device. For example, an accelerator device can include multiple cores, multiple tiles, and so forth, in which case a physical resource can refer to a core, a tile, and so forth. A "core" of an accelerator device can refer to a defined subset of the processing circuitry of the accelerator device, where the core can execute instructions independently of another core of the accelerator device. A "tile" can refer to a larger subset of the accelerator device, and the tile can include multiple cores. The accelerator can be divided into additional or alternative partitions in other examples.

A "compiler" can refer to a machine or program that generates a representation of a neural network, where the representation can include information (such as in the form of instructions and data) that can be executed by physical resources. The compiler can receive as input a model of the neural network, where the model is programmed using a high-level language, such as C++, Python, and so forth. Based on the model of the neural network, the compiler generates the representation of the neural network for execution.

In some cases, there may be multiple different topologies of physical resources, where a topology of physical resources can refer to a given interconnect arrangement of physical resources. An "interconnect arrangement" of physical resources indicates how the physical resources are connected to one another. In some examples, a first topology may include a first interconnect arrangement of physical resources, a second topology may include a second interconnect arrangement of physical resources that is different from the first interconnect arrangement of physical resources, and so forth. In such cases, it can be difficult for the compiler to keep track of which topology is to be used for physical resources that are to execute the neural network.

Even if the compiler is able to optimize a neural network for a particular topology, the neural network that is compiled for the particular topology may not be able to run effectively on another topology. The compiler may have embedded physical addresses of physical resources into the compiled neural network, where the embedded physical addresses assume the particular topology of physical resources. The embedded physical addresses in the compiled neural network would not be useable for a different topology of physical resources.

In accordance with some implementations of the present disclosure, as shown in FIG. 1, a system 100 includes a compiler 102 that can generate a neural network 104 based on an input model of the neural network 106 (also referred to as a "neural network model" 106). The system 100 can be implemented using a computer.

The generation of the neural network 104 is based on compiling, by the compiler 102, the neural network model 106. Compiling includes converting information in an initial form (such as according to a high-level programming language in the neural network model 106) to a compiled form that includes machine-readable instructions, data, and neural network parameters.

The neural network parameters are applied to the data that is input into the neural network 104. Examples of neural network parameters include weights and biases.

A "weight" of a neural network can be assigned to a connection between nodes of the neural network, where the nodes represent respective artificial neurons of the neural network. Each weight represents a strength of a connection between the connected nodes, and the weight affects an amount of influence a change in the data input at a first node (representing a first neuron) will have on data output by the first node along the connection to a second node (representing a second neuron).

A "bias" indicates how far off the predictions of the neural network are from intended values. A bias can be added to a value produced based on combining data and a weight.

Neural network parameters such as weights and biases of a neural network are learnable parameters that can change over time as training of the neural network continues.

The machine-readable instructions (or more simply, "instructions") of the neural network 104 can include instructions to perform various operations, including vector-matrix or dot product computations, sorting operations, and so forth. The instructions can also include send instructions (to send data from a first entity to a second entity). Although some examples of instructions are listed, it is noted that the neural network 104 generated by the compiler 102 can include other types of instructions.

In some examples, the compiler 102 includes a frontend interface with which application developers can interact for the purpose of deploying neural networks. An application developer can write the neural network model 106 and provide the neural network model 106 to the compiler 102 using the frontend interface.

In some examples, the compiler 102 further includes a backend interface that interacts with other components of the system 100 to deploy the compiled neural network 104 (generated by the compiler 102) onto physical resources (discussed further below).

The neural network 104 generated by the compiler 102 includes logical identifiers of compute resources. A "logical identifier" refers to an identifier that identifies a logical resource (also referred to here as a "compute resource") rather than a physical resource. The data and neural network parameters (e.g., weights and biases) of the neural network 104 can also be associated with logical identifiers.

To allow execution of the neural network 104, a scheduler 108 is able to map the logical identifiers of the neural network 104 to physical addresses of physical resources (selected from among physical resources 114-1 to 114-5) in a host system 113. In some examples, the physical resources 114-1 to 114-5 can be implemented using accelerator devices. A "physical resource" can refer to an entirety of an accelerator device, or a portion (e.g., core or tile) of the accelerator device.

A "scheduler" can refer to a machine or program that maps a neural network to a selected topology of physical resources. The host system 113 may have a population of physical resources 114-1 to 114-5 that can be partitioned into different topologies. As further shown in FIG. 1, there are two possible topologies (Topology 1 and Topology 2) of the physical resources 114-1 to 114-5. Topology 1 includes the physical resources 114-1, 114-2, and 114-4. Topology 2 includes physical resources 114-3 and 114-5. Although FIG. 1 shows an example of just two topologies, it is noted that in other examples, there can be more than two topologies or there can just be a single topology. Also, in some cases, multiple topologies can share a physical resource (or multiple physical resources).

The scheduler 108 is able to select a subset (in the form of a topology) of physical resources from a larger collection of physical resources to deploy the compiled neural network 104. As discussed further below, the selection of a topology of physical resource on which the compiled neural network 104 is to execute can be based on latency information relating to communications between physical resources. Latency information is discussed further below.

Each topology of physical resources is based on grouping, by the scheduler 108, groups of physical resources. A group of physical resources make up a logical resource used to execute a compiled neural network. In some examples, the scheduler 108 can form dynamic groups of physical resources (dynamic grouping is discussed further below).

A "host system" can refer to a platform including a computer, that has physical resources on which a neural network (or multiple neural networks) can be deployed. The host system 113 can be part of the system 100, or alternatively, the host system 113 can be separate from the system 100.

The mapping of the logical identifiers of the neural network 104 to respective physical addresses of physical resources can be provided to a loader 110. A "loader" can refer to a machine or program that retrieves executable instructions from a compiled code (such as the neural network 104) and inputs the retrieved executable instructions into storage elements (e.g., execution buffers or registers, etc.) of a physical resource (e.g., any of 114-1 to 114-5) to allow the instructions to execute on the physical resource.

The loader 110 can load instructions, data, and neural network parameters (e.g., weights and biases) of the neural network 104 onto the selected physical resources. The loading includes converting the logical identifiers (associated with instructions, data, and neural network parameters) in the neural network 104 to the physical addresses of the selected physical resources, and loading the neural network instructions, data, and neural network parameters along with the physical addresses for execution on the selected physical resources. In addition, the loader 110 re-encodes instructions (containing logical identifiers) of the neural network 104 into instructions containing physical addresses converted from the respective logical identifiers.

The encoding of logical identifiers of compute resources to physical addresses of physical resources to execute the compiled neural network 104 can be performed by the loader 110 "on-the-fly," as part of the loading stage. In other words, the physical addresses of physical resources to implement the compiled neural network 104 do not have to be statically encoded into the neural network 104 at the compilation stage performed by the compiler 102. The dynamic or runtime translation of logical resources to available physical resources provides more flexibility in selecting which available physical resources to use. The dynamic or runtime translation of logical resources to available physical resources also allows for selection of physical resources that optimizes performance and efficiency, such as by reducing latency of communications based on latency information, and selecting a topology with a quantity of physical resources that matches closely with the quantity of compute resources in the neural network 104 to avoid idle physical resources.

The system 100 also includes a driver 112, which is a device driver for the physical resources 114-1 to 114-5. The driver 112 is a machine or program that provides an interface to the physical resources 114-1 to 114-5. Interactions (such as by the loader 110 and the scheduler 108) with the physical resources 114-1 to 114-5 are performed through the driver 112. Thus, the loader 110 can load instructions, data, neural network parameters, and physical addresses (converted from logical identifiers of the neural network 104) through the driver 112 onto the physical resources 114-1 to 114-5.

In some examples, in the host system 113, the physical resources 114-1 to 114-5 can be connected over a bus 116, such as a Peripheral Component Interconnect (PCI) bus or another type of computer bus. In further examples, at least some of the physical resources 114-1 to 114-5 can also be connected over a network fabric 118. Examples of the network fabric 118 can include any of various different types of networks, such as networks that employ proprietary network protocols or other types of networks. In some examples, the communication bandwidth over the network fabric 118 can be greater than the communication bandwidth over the bus 116.

The system 100 also includes a processor (or multiple processors) 120. A processor can include a microprocessor, a core of a multi-core microprocessor, a microcontroller, a programmable integrated circuit, a programmable gate array, a digital signal processor, or another hardware processing circuit. The processor(s) 120 can execute system programs of the system 100, such as an operating system (OS), an application program, a firmware program, or any other types of machine-readable instructions.

In some examples, the entire compiled neural network 104 is deployed onto selected physical resources from among the physical resources 114-1 to 114-5 of the host system 113, where the physical resources 114-1 to 114-5 are dedicated to executing neural networks. In such examples, no portion of the compiled neural network 104 is executed by a general-purpose processor, such as the processor 120, a general processing unit (GPU), or any other processing circuit that may execute other programs, such as an OS, an application program, a firmware, and so forth.

Although FIG. 1 shows the compiler 102, scheduler 108, and the loader 110 as separate components in the system 100, it is noted that in other examples, any combination of the foregoing can be combined into a common component, or the functionality of any of the foregoing can be divided into multiple components.

Figure 2:
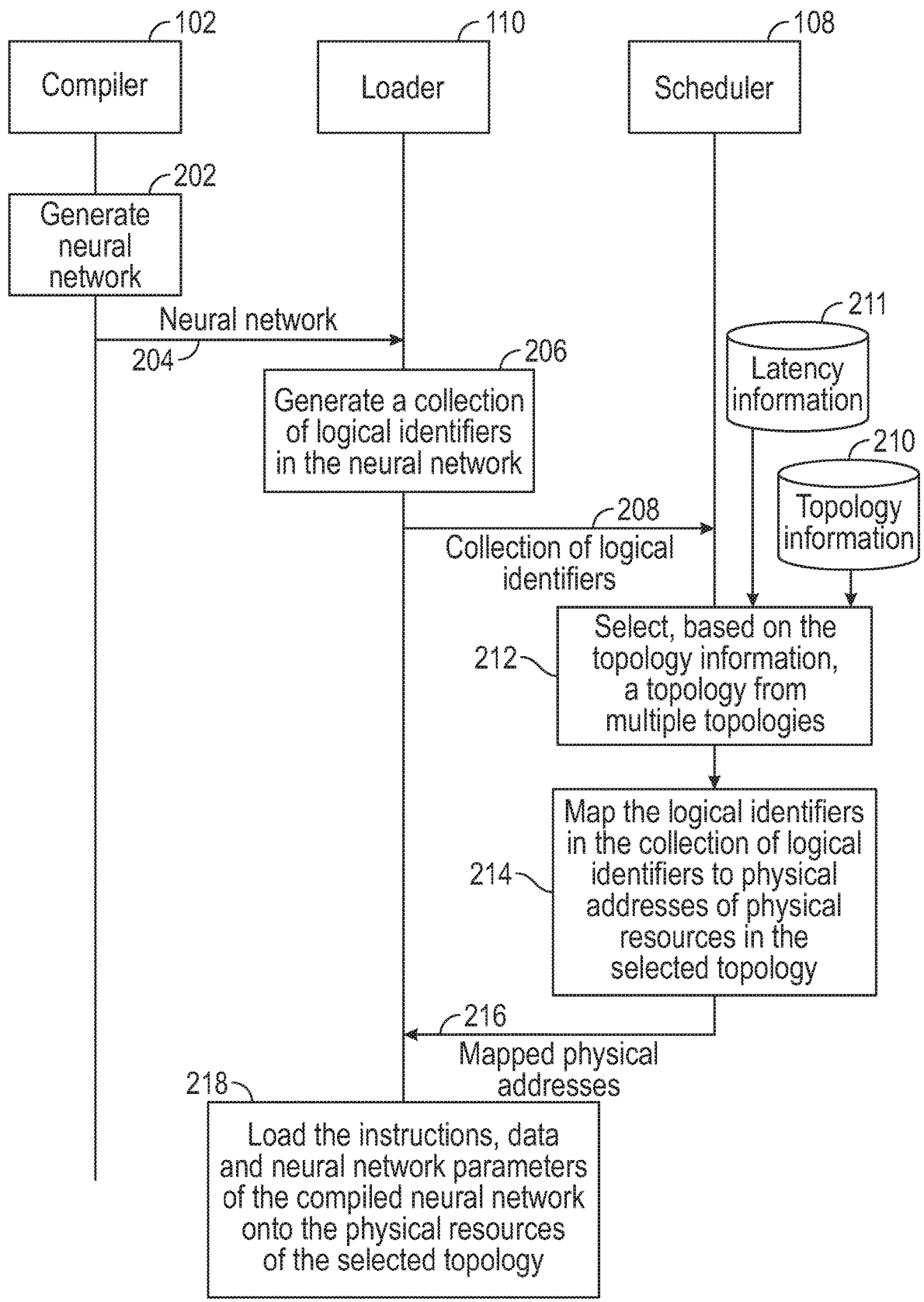
FIG. 2 is a message flow diagram of a process involving a compiler, a loader, and a scheduler, according to some examples.

FIG. 2 is a message flow diagram that depicts various tasks performed by the compiler 102, the loader 110, and the scheduler 108, according to some examples. The compiler 102 generates (at 202) a neural network (e.g., 104 in FIG. 1) based on a neural network model (e.g., 106 in FIG. 1). In some examples, when compiling a neural network model, the compiler 102 can assume that a quantity of physical resources would be available when executing the neural network. In further examples, the compiler 102 attempts to optimize the neural network model to use a minimum (or reduced) quantity of compute resources (and thus a minimum quantity of physical resources). Any of various techniques for achieving an objective of a minimum number of compute resources in implementing a neural network model can be employed.

In other examples, the compiler 102 can obtain information regarding the quantity of available physical resources. Obtaining information regarding the quantity of available physical resources can be accomplished based on the compiler 102 sending a query to the loader 110, which in turn forwards the query to the driver 112 to obtain the quantity of available physical resources. In the latter example, when generating the neural network, the compiler 102 is aware of the quantity of available physical resources for which the compiler 102 is to generate the neural network. For example, if the compiler 102 obtains information indicating that 12 physical resources are available, then the compiler 102 can generate the neural network to include logical identifiers of 12 compute resources (which are logical resources corresponding to the 12 physical resources).

The compiler 102 sends (at 204) the generated (compiled) neural network to the loader 110. The loader 110 can generate (at 206) a collection (e.g., a list) of distinct logical identifiers that are included in the compiled neural network. For example, the loader 110 can extract the distinct logical identifiers included in the compiled neural network based on parsing the compiled neural network. "Distinct" logical identifiers identify respective different compute resources.

The loader 110 sends (at 208) the collection of logical identifiers to the scheduler 108. The scheduler 108 accesses topology information 210 to select (at 212) a topology from among multiple different topologies of physical resources specified by the topology information 210. The topology information 210 is stored in a storage medium, which can be implemented using a storage device or multiple storage devices, where a "storage device" can refer to a volatile or nonvolatile memory device, a persistent storage device such as a disk-based storage device, and so forth.

In further examples, the scheduler 108 can select the topology from among multiple different topologies further based on latency information 211 stored in the storage medium. The latency information 211 is discussed further below.

FIG. 1 shows an example with two topologies of physical resources (Topology 1 and Topology 2). The topology information identifies which physical resources are included in each respective topology, and how the physical resources are connected to one another (e.g., which physical resource is connected to which other physical resource, and/or the type of network (such as the bus 116 or the network fabric 118 of FIG. 1) used to connect any sub-group of physical resources).

The topology selected by the scheduler 108 can be the topology with a quantity of physical resources that are sufficient to map to the compute resources identified by the logical identifiers in the collection of logical identifiers. For example, if the collection of logical identifiers identify three compute resources, then the scheduler 108 selects Topology 1 (FIG. 1), which has three physical resources, rather than Topology 2 (FIG. 1), which has just two physical resources. In further examples, the topology selected can be the topology with a quantity of physical resources that is greater than or equal to the quantity of compute resources identified by the collection of logical identifiers.

After the selection of the topology, the scheduler 108 maps (at 214) the logical identifiers in the collection of logical identifiers to physical addresses of the physical resources in the selected topology. The mapped physical addresses are sent (at 216) to the loader 110, which then loads (at 218) the instructions, data, and neural network parameters of the compiled neural network onto the physical resources of the selected topology. As part of the loading, the loader 110 converts logical identifiers associated with the instructions, data, and neural network parameters of the compiled neural network into physical addresses mapped by the scheduler 108. Also, the loader 110 re-encodes instructions (containing logical identifiers) of the compiled neural network into instructions containing physical addresses converted from the respective logical identifiers.

Figure 3:
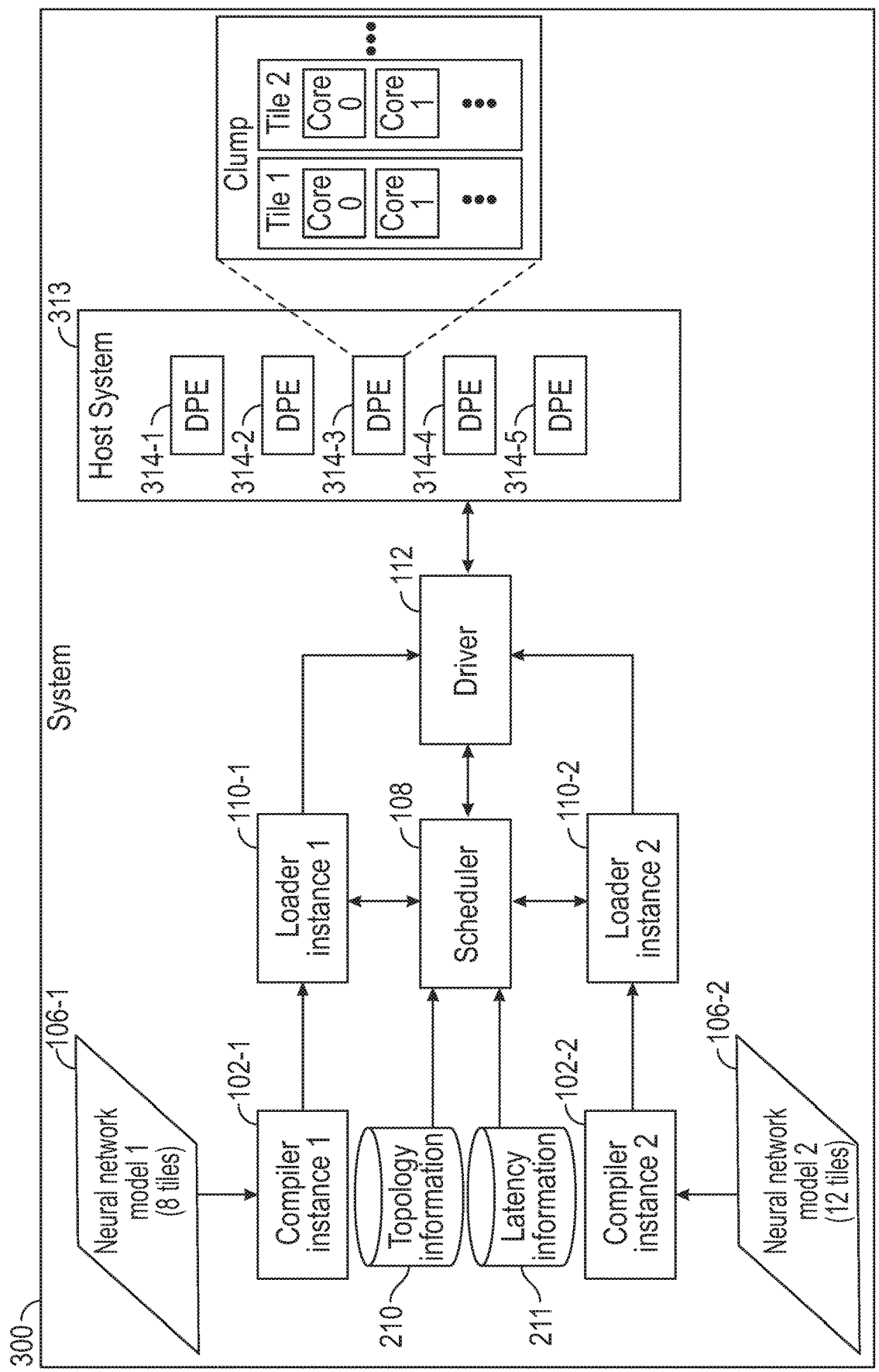
FIG. 3 is a block diagram of another example system that includes physical resources that can be used to deploy neural networks based on mappings of logical identifiers to physical addresses by a scheduler, in accordance with further examples.

FIG. 3 shows a different example system 300 that includes components for generating compiled neural networks and loading neural networks onto physical resources for execution. The physical resources of a host system 313 in the system of FIG. 3 include dot product engines (DPEs) 314-1 to 314-5. In some examples, a DPE can have a Programmable Ultra-Efficient Memristor-based Accelerator (PUMA) architecture. In other examples, a DPE can have a different architecture.

In examples according to FIG. 3, each of the DPEs 314-1 to 314-5 has a clump, where there is one clump per DPE (or alternatively, multiple clumps per DPE). Each clump has a set of tiles, and each tile has a set of cores. Each core includes a set of memristor crossbars used to perform matrix vector multiplication, for example. The cores also can contain vector and scalar arithmetic units. Each DPE is assigned a Chip-id, each clump is assigned a Clump-id, and each tile is assigned by a Tile-id.

In the example of FIG. 3, two neural network models 106-1 and 106-2 are provided as input to the system 300 for compilation and for execution using physical resources of the DPEs 314-1 to 314-5 of the host system 313. Multiple compiler instances 102-1 and 102-2 are executed to compile the respective neural network models 106-1 and 106-2. Each compiler instances 102-1 or 102-2 is similar to the compiler 102 of FIG. 1.

The compiler instances 102-1 generates a first compiled neural network based on the neural network model 106-1, and provides the first compiled neural network to a loader instance 110-1. Similarly, the compiler instances 102-2 generates a second compiled neural network based on the neural network model 106-2, and provides the second compiled neural network to a loader instance 110-2. The loader instances 110-1 and 110-2 are similar to the loader 110 of FIG. 1.

Each loader instance 110-1 or 110-2 interacts with the scheduler 108 in a manner similar to the interaction of the loader 110 and the scheduler 108 of FIG. 1. In examples according to FIG. 3, although there are multiple instances of the compiler and of the loader, the system 300 can include just one instance of the scheduler 108. In some examples, the one instance of the scheduler 108 allows the scheduler to be aware of the topologies used in the system 300, so that the scheduler 108 is able to select groups of physical resources that are more effective in executing neural networks. Similarly, the system 300 includes just one instance of the driver 112.

For the first compiled neural network produced by the compiler instance 102-1, the scheduler 108 selects a first topology based on the topology information 210 and the latency information 211. Similarly, for the second compiled neural network produced by the compiler instance 102-2, the scheduler 108 selects a second topology based on the topology information 210 and the latency information 211.

In the example of FIG. 3, the neural network model 106-1 is to use 8 tiles, whereas the neural network model 106-2 is to use 12 tiles. The first compiled neural network generated by the compiler instance 102-1 includes 8 Tile-ids to identify 8 tiles. Note that the Tile-ids in the first compiled neural network are logical identifiers for the tiles—in other words, the Tile-ids in the first compiled neural network do not identify specific tiles in specific DPEs 314-1 to 314-5.

The second compiled neural network generated by the compiler instance 102-2 includes 12 Tile-ids to identify 12 tiles. Note that the Tile-ids in the second compiled neural network are logical identifiers for the tiles.

The loader instance 110-1 provides a list of 8 Tile-ids to the scheduler 108, and the loader instance 110-2 provides a list of 12 Tile-ids to the scheduler 108. Based on each list, the scheduler 108 selects a topology of physical resources that has a sufficient number of tiles to execute the respective compiled neural network.

For example, the scheduler 108 selects a first apology that has 8 physical tiles (or more) to execute the first compiled neural network, and the scheduler 108 selects a second topology that has 12 physical tiles (or more) to execute the second neural network.

Based on the first apology, the scheduler 108 maps the 8 logical Tile-ids of the first compiled neural network to corresponding 8 physical addresses of physical tiles in selected DPEs, and similarly, the scheduler 108 maps the 12 logical Tile-ids of the second compiled neural network to corresponding 12 physical addresses of physical tiles in selected DPEs. In some examples, a physical address in the context of FIG. 3 is in the form of a combination of a Chip-id, a Clump-id, and a Tile-id. In other examples, other types of physical addresses can be used.

Each loader instance 110-1 or 110-2 at the time of loading the compiled neural network converts, on-the-fly, the logical Tile-ids to physical addresses of the form Chip-id, Clump-id and Tile-Id, and encodes the physical addresses in the respective compiled neural network.

As noted above, logical identifiers can be associated with instructions, data, and neural network parameters (e.g., weights and biases) of a compiled neural network, such as that produced by the compiler instance 102-1 or 102-2. In the foregoing example, logical identifiers in the form of Tile-ids can be associated with instructions, data, and neural network parameters (e.g., weights and biases) of a compiled neural network.

In some examples, tiles and cores of a DPE can include instruction buffers (to store instructions of neural networks) and data buffers (to store data of neural networks).

Each core of a DPE can include a processing circuit (referred to as a matrix-vector multiplication unit or MVMU, for example) that can perform vector-matrix or dot product computations. Weights of a neural network can refer to matrices that are preprogrammed on MVMUs, before execution of the neural network is started. Thus, as part compiling a neural network model, a compiler assigns weights to "logical" MVMUs.

Biases are constants used by the MVMUs. The compiler identifies a storage location (such as in a tile data buffer) and generates load and store instructions for cores that are to access the biases.

Logical identifiers can be assigned by the compiler to the weights and biases.

The following provides an example fo performing an expression $O=(M*X)+Y$, where M represents a matrix of weights, Y represents constant biases, X represents an input vector (input data), which can be continually varying for a neural network, and O represents an output vector (output data) that varies depending upon the input vector.

For the above expression, the compiler assigns logical identifiers to the matrix of weights and the biases. Logical identifiers can also be assigned to instructions in the instruction buffers of the tiles and/or cores.

As noted above, the scheduler 108 considers the latency information 211 when selecting a topology for a compiled neural network. The latency information 211 can be in the form of a latency table or a latency graph.

Table 1 below is an example of a latency table.

TABLE 1

|  | Receiver DPE 1 | Receiver DPE 2 | Receiver DPE 3 | Receiver DPE 4 | Receiver DPE 5 |
|---|---|---|---|---|---|
| Sender DPE 1 | 00 | 10 | 100 | 20 | 100 |
| Sender DPE 2 | 10 | 00 | 100 | 10 | 100 |
| Sender DPE 3 | 100 | 100 | 00 | 100 | 10 |
| Sender DPE 4 | 20 | 10 | 100 | 00 | 100 |
| Sender DPE 5 | 100 | 100 | 10 | 100 | 00 |

Each entry of the latency table is a time value representing a communication latency (delay time) associated with a time involved in communicating (sending or receiving) data between a respective pair of DPEs. A "sender DPE" is a DPE that sends data, and a "receiver DPE" is a DPE that receives data. A value of "00" represents a delay time to communicate within the same DPE, such as between tiles or cores of the same DPE. A value of "10" represents a delay time to communicate between a pair of DPEs (or more specifically, between tiles or cores in the pair of DPEs) with zero hops over a network fabric (e.g., 118 in FIG. 1). A value of "20" represents a delay time to communicate between a pair of DPEs with one hop over a network fabric. A number of hops refers to a number of communication nodes that data passes through from a source device to a destination device.

A value of "100" presents a delay time to communicate between a pair of DPEs over a system bus, such as the bus 116 of FIG. 1. A higher value represents a larger delay time (i.e., larger latency). Although example values are shown in Table 1, it is noted other values can be used in other examples.

Note that the example latency table of Table 1 shows that the latency in both directions between any given pair of DPEs is the same (since DPEs are capable of bidirectional communications with one another). In other examples, the latency table can be extended to represent different latencies in different directions between a pair of DPEs. Also, in further examples, the latency table can represent latencies for unidirectional communications.

Instead of using a latency table, a latency graph can be used instead, where the latency graph uses nodes to represent respective DPEs, and weights assigned to links between the nodes to represent latencies between the connected DPEs.

In some examples, the scheduler 108 is able to update the latency information 211. Initially, the latency information 211 may be configured by an entity, such as a user, an administrator, a machine, or a program. During operation of the system 100 or 300, the scheduler 108 is able to query the driver 112 to determine how DPEs communicate among one another, e.g., whether a pair of DPEs communicate over a bus or a network fabric (and if over a network fabric, how many hops). Based on responses of the driver 112 to the queries, the scheduler 108 is able to update respective entries of the latency information 211 when appropriate to reflect a current latency between each pair of DPEs.

When a compiler (102, 102-1, or 102-2) compiles a neural network model, the compiler is unaware of the specific physical topologies of physical resources on which a neural network is to be deployed. The compiler is also unaware of the latencies associated with communications between the physical resources. When assigning logical identifiers, the compiler can assume that the communication latency increases as the difference in value of the logical identifier of respective compute resources increases. For example, assume there are logical identifiers 1, 2, and 3, the compiler can assume that a communication latency between compute resources having respective logical identifiers 1 and 2 is less than a communication latency between compute resources having respective logical identifiers 1 and 3.

When the logical identifiers of the compiled neural network are shared by the loader with the scheduler 108, the scheduler 108 can refer to the latency information 211 and implement an algorithm to identify a set of physical resources that can send and receive data with reduced communication latency. For example, in FIG. 3, if a compiled neural network is to use three DPEs, then the scheduler 108 identifies a topology with a sufficient number of DPEs to map to the logical identifiers. In this identified topology, the scheduler 108 selects a first DPE to map to a first logical identifier of the compiled neural network. The scheduler 108 then selects a second DPE to map to a second logical identifier of the compiled neural network, where the second DPE selected is one which the latency information 211 indicates as having a relatively low communication latency (e.g., a low latency entry value in the latency table of Table 1) to the first DPE. For example, in Table 1, DPE 2 is associated with the lowest latency entry value, "10", as compared to DPE 3, DPE 4, or DPE 5. Thus, DPE 2 is selected as the second DPE to map to the second logical identifier.

The scheduler 108 then selects a third DPE to map to a third logical identifier of the compiled neural network, where the third DPE selected is one which the latency information 211 indicates as having a relatively low communication latency to the second DPE (DPE 2). In Table 1, DPE 4 is associated with the lowest latency entry value, "10", as compared to DPE 3 or DPE 5. Thus, DPE 4 is selected as the third DPE to map to the third logical identifier.

In the foregoing example, the scheduler 108 maps the physical address of DPE 1 to the first logical identifier, the physical address of DPE 2 to the second logical identifier, and the physical address of DPE 4 to the third logical identifier.

Each topology of physical resources is based on grouping, by the scheduler 108, groups of physical resources. A group of physical resources make up a logical device used to execute a compiled neural network.

Techniques that rely on static grouping may have various issues. With static grouping, a user or administrator can manually create a logical device from a group of physical resources. When static groups of physical resources are used, a neural network can be loaded onto a static group of physical resources so long as the static group of physical resources can meet the resource requests of the neural network. However, in cases where the static group has more physical resources than used by the neural network, then there may be some unused physical resources of the static group that may remain unavailable for use by other neural networks. To allow unused physical resources to be made available for other neural networks, a user or administrator may have to manually delete and re-create new static groups of physical resources, which is a labor-intensive and time-consuming process. Additionally, when creating or modifying static groups of physical resources, the user or administrator may have be familiar with latencies of the physical resources to allow more efficient utilization of the physical resources.

In accordance with some implementations of the present disclosure, the scheduler 108 can use dynamic grouping to form a logical device using a group of physical resources without manual intervention. The scheduler 108 is able to determine the resources requested by a neural network, and the scheduler 108 can select a group of physical resources to execute the neural network. As noted above, the scheduler 108 is able to select physical resources for a neural network based on the topology information 210 and the latency information 211. The scheduler 108 requests the driver 112 to group the selected physical resources to create a corresponding logical device. Creating a logical device by the driver 112 can include creating a list of device structures for all physical resources that are part of the dynamic group. The "device structure" can contain any of the following information relating to a physical resource: a bus type of the physical resource, a parent physical resource reference (if applicable), physical resource access and state information, instance and class information if any for the physical resource, etc. In other examples, the driver 112 can maintain other physical resource information for physical resources that are part of a dynamic group corresponding to a logical device.

When multiple neural networks are to be deployed on physical resources of a single host system, the scheduler 108 can select respective groups of physical resources of the host system for deploying the multiple neural networks in a way that load balances usage of physical resources in the host system, to improve physical resource utilization.

In the example of FIG. 3, assume that a first neural network specifies use of a first number of tiles, and a second neural network specifies use of a second number tiles. For the first neural network, the scheduler 108 can select the tiles of the DPE 314-1 and the DPE 314-2 (which are part of a first dynamic group forming a first logical device) for executing the first neural network.

When the second neural network is to be subsequently executed, the scheduler 108 can dissolve the first dynamic group. The scheduler 108 can then select the tiles of the DPE 314-1, the DPE 314-2, and the DPE 314-4 (which are part of a second dynamic group forming a second logical device) to form a new dynamic group for executing the second neural network.

Figure 4:
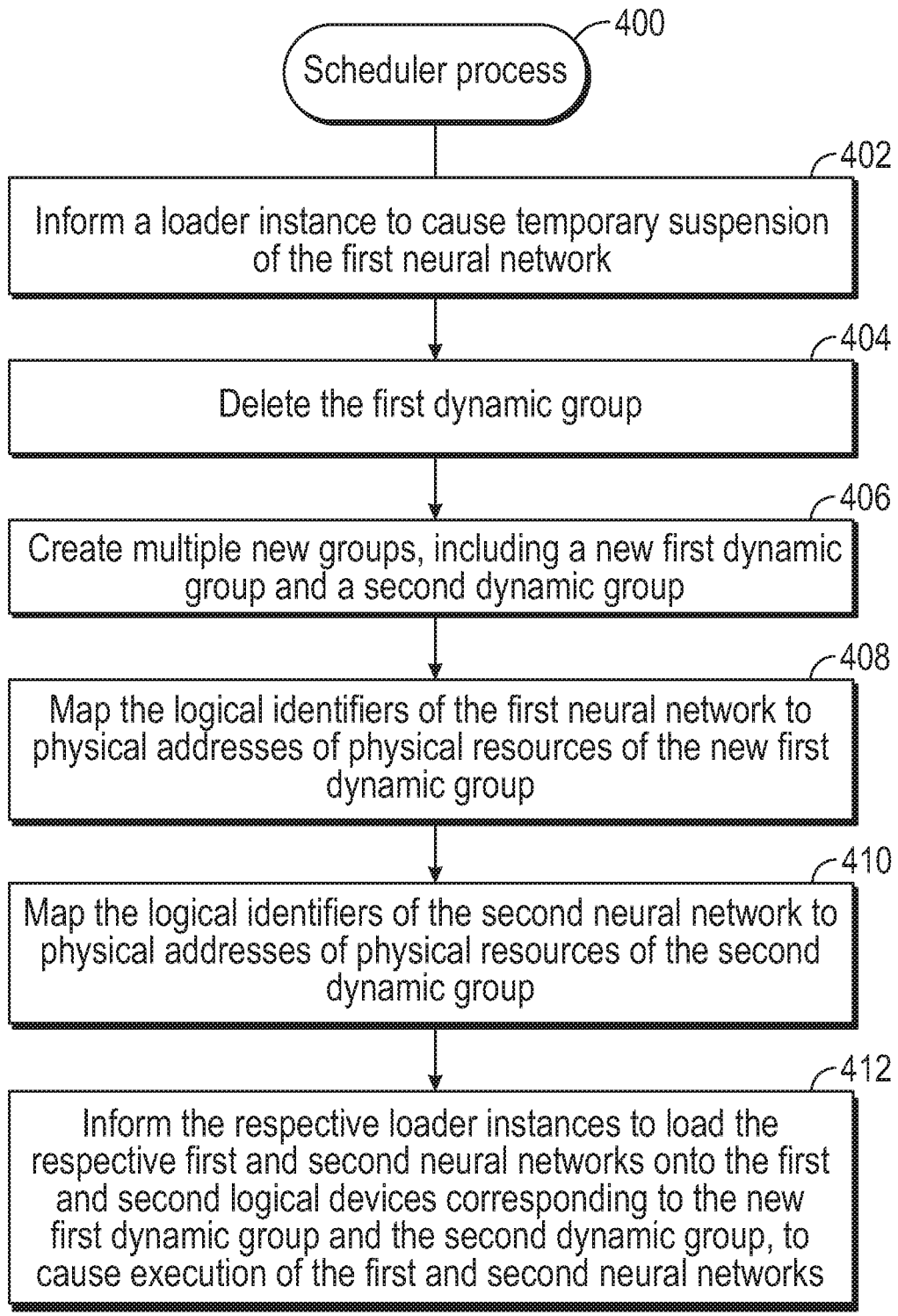
FIG. 4 is a flow diagram of a process of a scheduler, according to some examples.

In some examples, to dissolve a logical group that is already executing a first neural network for the purpose of forming another logical group to execute a second neural network, the scheduler 108 can perform a process 400 as shown in FIG. 4.

The scheduler 108 can cause (at 402) temporary suspension of the first neural network (e.g., including DPEs 314-1 and 314-2 of FIG. 3). The temporary suspension can be initiated by the scheduler 108 informing (e.g., by sending a message, an information element, a command, or other indication) a loader instance (e.g., 110-1) to suspend feeding new input data into the first logical device, or to suspend loading any new input data.

While the execution of the first neural network is suspended, the loader may use a queue to store any incoming input data for the first neural network, for later processing by the first neural network when the temporary suspension is lifted.

The scheduler 108 deletes (at 404) the first dynamic group, with the help of the driver 112, such as by deleting the list of device structures of the physical resources associated with the first dynamic group. Deleting a dynamic group effectively deletes a logical device formed of the physical resources in the dynamic group without manual intervention. Deleting a dynamic group can refer to removing any representation or information of the dynamic group, such that the scheduler 108 no longer considers the dynamic group to exist. In some examples, the logical device can be deleted without having to perform the following manual tasks: stop the neural network from executing on the logical device, deleting the group of physical devices, re-creating a new group of physical resources, and restarting the execution of the new group.

After deleting the first dynamic group, the scheduler 108 creates (at 406) multiple new dynamic groups, including a new first dynamic group and a second dynamic group. The second dynamic group can include, for example, DPEs 314-1, 314-2, and 314-4 for executing the second neural network, and the new first dynamic group can include, for example, DPEs 314-3 and 314-5 for executing the second neural network.

The scheduler 108 maps (at 408) the logical identifiers of the first neural network (which is currently in suspended state) to physical addresses of physical resources of the new first dynamic group (e.g., tiles of DPEs 314-3 and 314-5). The scheduler 108 maps (at 410) the logical identifiers of the second neural network (not yet started) to physical addresses of physical resources of the second dynamic group (e.g., tiles of DPEs 314-1, 314-2, and 314-4).

Next, the scheduler 108 can inform (at 412) the respective loader instances (e.g., 110-1 and 110-2) to load the respective first and second neural networks onto the first and second logical devices corresponding to the new first dynamic group and the second dynamic group, to cause execution of the first and second neural networks. As a result, the temporary suspension of execution of the first neural network is lifted. As part of loading the respective first and second neural networks onto the first and second logical devices, the loader instances can pick up the logical-identifier-to-physical-address mappings (at 408 and 410) performed by the scheduler 108 on the fly, and encode the physical addresses into the respective first and second neural networks for execution on the first and second logical devices, respectively.

By using techniques or mechanisms according to some examples of the present disclosure, performance and throughput of a neural network can be improved based on selection of physical resources to execute the neural network that considers topology information and latency information. The compiler does not have to be configured to be aware of the underlying topology of physical resources. As a result, a compiled neural network generated by the compiler can include logical identifiers of compute resources rather than physical addresses of physical resources. Application developers that create neural network models do not have to familiar with the underlying topology of physical resources.

Execution of a neural network can be moved from a first group of physical resources to a second group of physical resources (which can correspond to different topologies), based on use of logical identifiers in the neural network rather than physical addresses.

In some examples, the scheduler 108 is able to provide feedback, such as to a user or administrator, regarding utilization of physical resources in a system for executing neural networks. This allows the user or administrator to determine how much more capacity remains in the system to execute additional neural networks.

Figure 5:
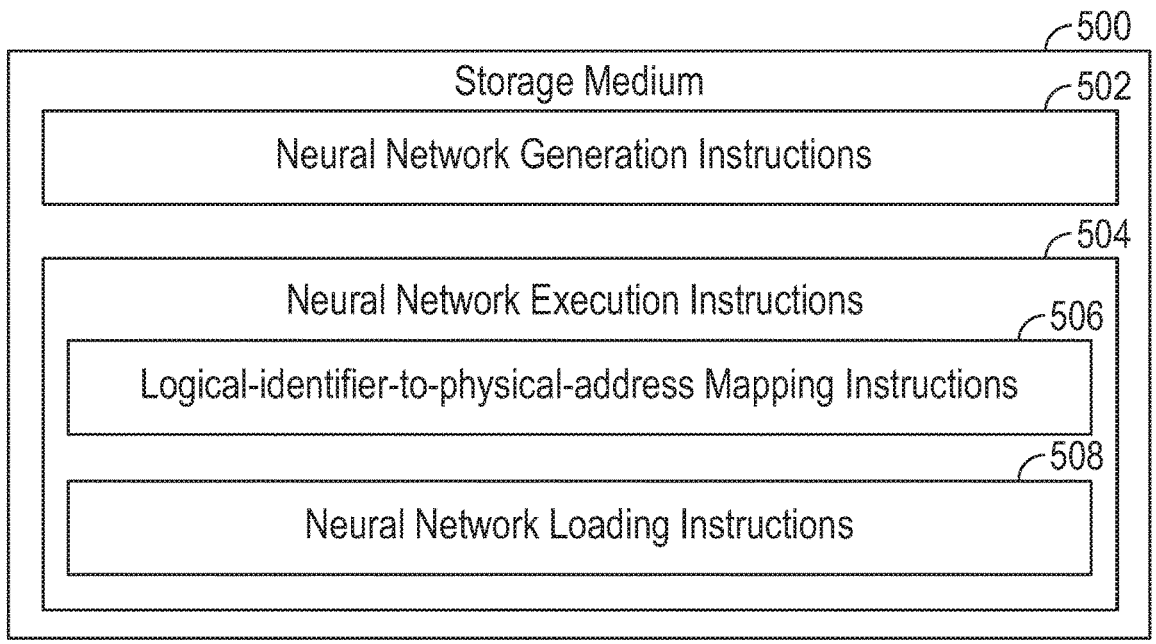
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to various tasks.

The machine-readable instructions include neural network generation instructions 502 to generate a neural network comprising logical identifiers of compute resources. For example, the neural network can be generated by a compiler that compiles an input model of a neural network.

The machine-readable instructions include neural network execution instructions 504 to execute the neural network. The neural network execution instructions 504 include logical-identifier-to-physical-address mapping instructions 506 to map the logical identifiers in the neural network to physical addresses of physical resources.

In some examples, the mapping of the logical identifiers to the physical addresses of the physical resources is based on latency information indicating communication latency among the physical resources, and a number of distinct logical identifiers in the neural network.

The neural network execution instructions 504 further include neural network loading instructions 508 to load instructions of the neural network onto the physical resources, where the loading includes converting the logical identifiers in the neural network to the physical addresses.

In addition to loading instructions of the neural network, data and neural network parameters (e.g., weights and biases) can also be loaded onto the physical resources to execute the neural network. The logical identifiers converted to the physical addresses are associated with any or some combination of the instructions of the neural network, data of the neural network, and neural network parameters of the neural network.

The loading of the instructions of the neural network onto the physical resources includes re-encoding the instructions to change logical identifiers in the instructions to physical addresses of the physical resources.

In some examples, the physical resources are included in hardware accelerator devices, and the physical addresses identify the physical resources in the hardware accelerator devices.

In some examples, a scheduler selects, based on topology information, the physical resources to use for the neural network, where the topology information identifies different topologies of physical resources.

In some examples, the selecting of the physical resources to use for the neural network based on the topology information includes selecting a topology of the different topologies, the selected topology having a quantity of physical resources that is equal to or greater than a quantity of the compute resources identified by the neural network.

Figure 6:
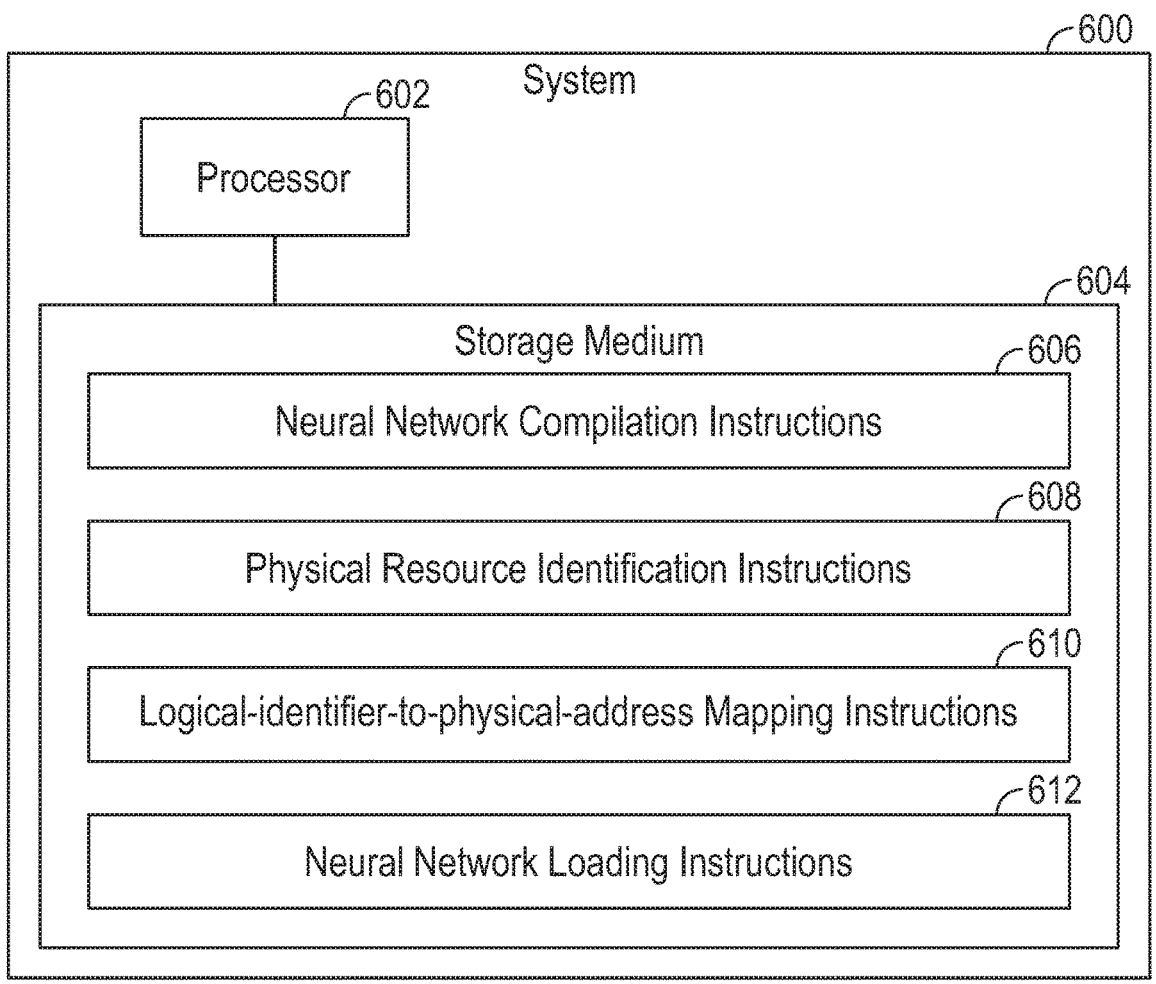
FIG. 6 is a block diagram of a system according to some examples.

FIG. 6 is a block diagram of a system 600 that includes a hardware processor 602 (or multiple hardware processors).

The system 600 further includes a storage medium 604 to store machine-readable instructions executable on the hardware processor 602 to perform various tasks. Machine-readable instructions executable on a hardware processor can refer to the instructions executable on a single hardware processor or the instructions executable on multiple hardware processors.

The machine-readable instructions include neural network compilation instructions 606 to compile a neural network including logical identifiers of compute resources.

The machine-readable instructions include physical resource identification instructions 608 to identify physical resources to deploy the neural network.

In some examples, the machine-readable instructions select, based on topology information identifying different topologies of physical resources, a topology from among the different topologies of physical resources, where the identified physical resources are part of the selected topology.

The machine-readable instructions include logical-identifier-to-physical-address mapping instructions 610 to map the logical identifiers in the neural network to physical addresses of the physical resources. In some examples, the mapping of the logical identifiers to the physical addresses of the physical resources is based on latency information indicating communication latency among the physical resources.

The machine-readable instructions include neural network loading instructions 612 to load instructions of the neural network onto the physical resources, wherein the loading comprises converting the logical identifiers in the neural network to the physical addresses.

Figure 7:
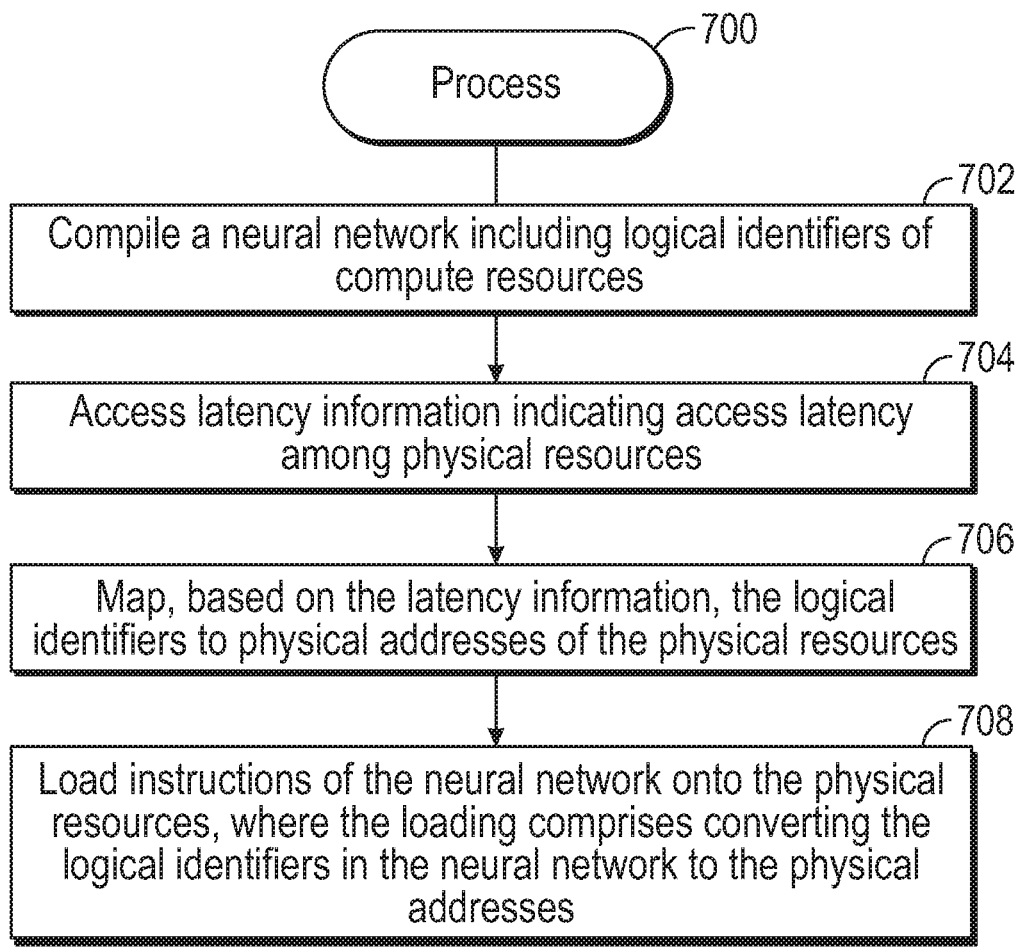
FIG. 7 is a flow diagram of a process according to some examples.

FIG. 7 is a flow diagram of a process 700 according to some examples. The process 700 includes compiling (at 702) a neural network including logical identifiers of compute resources.

The process 700 includes accessing (at 704) latency information indicating access latency among physical resources.

The process 700 includes mapping (at 706), based on the latency information, the logical identifiers to physical addresses of the physical resources.

The process 700 includes loading (at 708) instructions of the neural network onto the physical resources, where the loading comprises converting the logical identifiers in the neural network to the physical addresses.

A storage medium (e.g., 500 in FIG. 5 or 604 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising program instructions that upon execution cause a system to:
generate, by a compiler based on an input model, a neural network comprising machine-readable instructions and logical identifiers of logical compute resources, wherein the program instructions cause the system to generate the neural network by:
sending, from the compiler, a query to obtain information of a quantity of available physical resources, and
including, by the compiler, a quantity of the logical compute resources in the neural network based on the information of the quantity of available physical resources; and
for executing the neural network,
map the logical identifiers to physical addresses of physical resources selected from among the available physical resources, and
load the machine-readable instructions of the neural network onto the selected physical resources, wherein the loading comprises converting the logical identifiers in the neural network to the physical addresses.

2. The non-transitory machine-readable storage medium of claim 1, wherein the logical identifiers converted to the physical addresses are associated with any or some combination of the machine-readable instructions of the neural network, data of the neural network, and neural network parameters of the neural network.

3. The non-transitory machine-readable storage medium of claim 1, wherein the loading of the machine-readable instructions of the neural network onto the selected physical resources comprises re-encoding the machine-readable instructions to change the logical identifiers in the machine-readable instructions to the physical addresses of the selected physical resources.

4. The non-transitory machine-readable storage medium of claim 1, wherein the selected physical resources are included in hardware accelerator devices, and the physical addresses identify the selected physical resources in the hardware accelerator devices.

5. The non-transitory machine-readable storage medium of claim 1, wherein the program instructions upon execution cause the system to:
select, based on topology information, the selected physical resources to use for the neural network, wherein the topology information identifies different topologies of physical resources.

6. The non-transitory machine-readable storage medium of claim 5, wherein the selecting of the selected physical resources to use for the neural network based on the topology information comprises selecting a topology of the different topologies.

7. The non-transitory machine-readable storage medium of claim 6, wherein the different topologies of physical resources comprise a first topology of physical resources that includes a first quantity of physical resources, and a second topology of physical resources that includes a second quantity of physical resources, wherein the second quantity is different from the first quantity, and wherein the selecting of the topology is based on:
comparing how many physical resources are in the first quantity of physical resources to how many physical resources are in the second quantity of physical resources, and
selecting the topology with a quantity of physical resources sufficient to map to the logical compute resources in the neural network.

8. The non-transitory machine-readable storage medium of claim 7, wherein the selecting of the topology of the different topologies is based on latency information indicating communication latency among the available physical resources.

9. The non-transitory machine-readable storage medium of claim 8, wherein the latency information specifies a communication latency between a first accelerator device and a second accelerator device, and wherein each of the first accelerator device and the second accelerator device includes a plurality of physical resources.

10. The non-transitory machine-readable storage medium of claim 1, wherein the program instructions upon execution cause the system to:
dynamically group the selected physical resources into a first group of physical resources to form one logical device.

11. The non-transitory machine-readable storage medium of claim 10, wherein the neural network is a first neural network, and wherein the program instructions upon execution cause the system to:
generate a second neural network comprising logical identifiers of logical compute resources; and
identify physical resources for deploying the second neural network, wherein the identifying of the physical resources for deploying the second neural network load balances usage of physical resources in a host system.

12. The non-transitory machine-readable storage medium of claim 10, wherein the neural network is a first neural network, and wherein the program instructions upon execution cause the system to:
generate a second neural network comprising logical identifiers of logical compute resources;
temporarily suspend execution of the first neural network;
delete the first group of physical resources;
dynamically group the physical resources mapped to the logical identifiers of the first neural network to a second group of physical resources to form one logical device; and
dynamically group physical resources mapped to the logical identifiers of the second neural network to a third group of physical resources to form another logical device.

13. The non-transitory machine-readable storage medium of claim 12, wherein the program instructions upon execution cause the system to:
map the logical identifiers of the first neural network to physical addresses of the physical resources of the second group; and
map the logical identifiers of the second neural network to physical addresses of the physical resources of the third group.

14. A system comprising:
a processor; and
a non-transitory storage medium storing instructions executable on the processor to:
compile a neural network comprising logical identifiers of logical compute resources;
select, based on topology information identifying different topologies of physical resources, a topology from among the different topologies of physical resources, wherein the different topologies of physical resources comprise a first topology of physical resources that includes a first quantity of physical resources, and a second topology of physical resources that includes a second quantity of physical resources, wherein the second quantity is different from the first quantity, and wherein the selecting is based on:
- comparing how many physical resources are in the first quantity of physical resources to how many physical resources are in the second quantity of physical resources, and
- selecting the topology with a quantity of physical resources sufficient to map to the logical compute resources in the neural network;

map the logical identifiers to physical addresses of the physical resources in the selected topology; and load instructions of the neural network onto the physical resources, wherein the loading comprises converting the logical identifiers in the neural network to the physical addresses.

15. The system of claim 14, wherein the instructions are executable on the processor to:
compile the neural network by generating, using a compiler based on an input model, the neural network comprising machine-readable instructions and the logical identifiers of logical compute resources, wherein the generating of the neural network comprises:
- sending, from the compiler, a query to obtain information of a quantity of available physical resources, and
- including, by the compiler, a quantity of the logical compute resources in the neural network based on the information of the quantity of available physical resources.

16. The system of claim 14, wherein the mapping of the logical identifiers to the physical addresses of the physical resources is based on latency information indicating communication latency among the physical resources.

17. The system of claim 16, wherein the latency information specifies an amount of time to communicate data among the physical resources.

18. A method performed by a system comprising a hardware processor, comprising:
generating, by a compiler based on an input model, a neural network comprising machine-readable instructions, and logical identifiers of logical compute resources, wherein the generating of the neural network comprises:
- sending, from the compiler, a query to obtain information of a quantity of available physical resources, and
- including, by the compiler, a quantity of the logical compute resources in the neural network based on the information of the quantity of available physical resources;

accessing latency information indicating access latency among the available physical resources;

mapping, based on the latency information, the logical identifiers to physical addresses of physical resources selected from among the available physical resources; and loading the machine-readable instructions of the neural network onto the selected physical resources, wherein the loading comprises converting the logical identifiers in the neural network to the physical addresses.

19. The method of claim 18, further comprising:
selecting a topology from among different topologies of physical resources that comprise a first topology of physical resources that includes a first quantity of physical resources, and a second topology of physical resources that includes a second quantity of physical resources, wherein the second quantity is different from the first quantity, and wherein the selecting of the topology is based on:
- comparing how many physical resources are in the first quantity of physical resources to how many physical resources are in the second quantity of physical resources, and
- selecting the topology with a quantity of physical resources sufficient to map to the logical compute resources in the neural network, wherein the selected topology comprises the selected physical resources.

* * * * *